United States Patent [19]

Ditzler et al.

[11] Patent Number: 5,002,739
[45] Date of Patent: Mar. 26, 1991

[54] OZONE CELL WITH COOLING BELLOWS

[75] Inventors: Lee C. Ditzler, Diablo; Jerry F. Choy, Fremont; Ronald F. Lemberger, Danville, all of Calif.

[73] Assignee: Trineos, Pleasanton, Calif.

[21] Appl. No.: 580,683

[22] Filed: Sep. 11, 1990

[51] Int. Cl.⁵ ............................................. B01J 19/08
[52] U.S. Cl. ........................ 422/186.19; 422/186.07; 422/186.22
[58] Field of Search ................... 422/186.07, 186.19, 422/186.22

[56] References Cited

U.S. PATENT DOCUMENTS

| | | | |
|---|---|---|---|
| 4,159,971 | 7/1979 | Graupel | 250/540 |
| 4,216,096 | 8/1980 | Paré et al. | 250/539 |
| 4,504,446 | 3/1985 | Kunicki et al. | 422/186.19 |
| 4,764,349 | 8/1988 | Arft et al. | 422/186.18 |
| 4,774,062 | 9/1988 | Heinemann | 422/186.19 |
| 4,877,588 | 10/1989 | Ditzler et al. | 422/186.19 |

Primary Examiner—Brooks H. Hunt
Assistant Examiner—N. Bhat
Attorney, Agent, or Firm—Townsend and Townsend

[57] ABSTRACT

An ozone generation cell operating by corona discharge in an annular passage with regions of corona discharge alternating with corona-free regions where cooling takes place is improved by the incorporation of corrugated, deformable heat transfer walls in the corona-free regions. These corrugated walls impart flexibility to the structure, and thereby relieve the strain on the structural components. This permits the heat transfer wall, which is the outer of the two cylinders defining the annular passage, to center the inner of the two cylinders inside it and thus achieve a more uniform gap width in the corona regions. This is of value since the inner cylinder is preferably made of a ceramic material and not perfectly straight. The corrugations also promote turbulent flow in both the coolant medium and the gas mixture in which the ozone is generated.

5 Claims, 2 Drawing Sheets

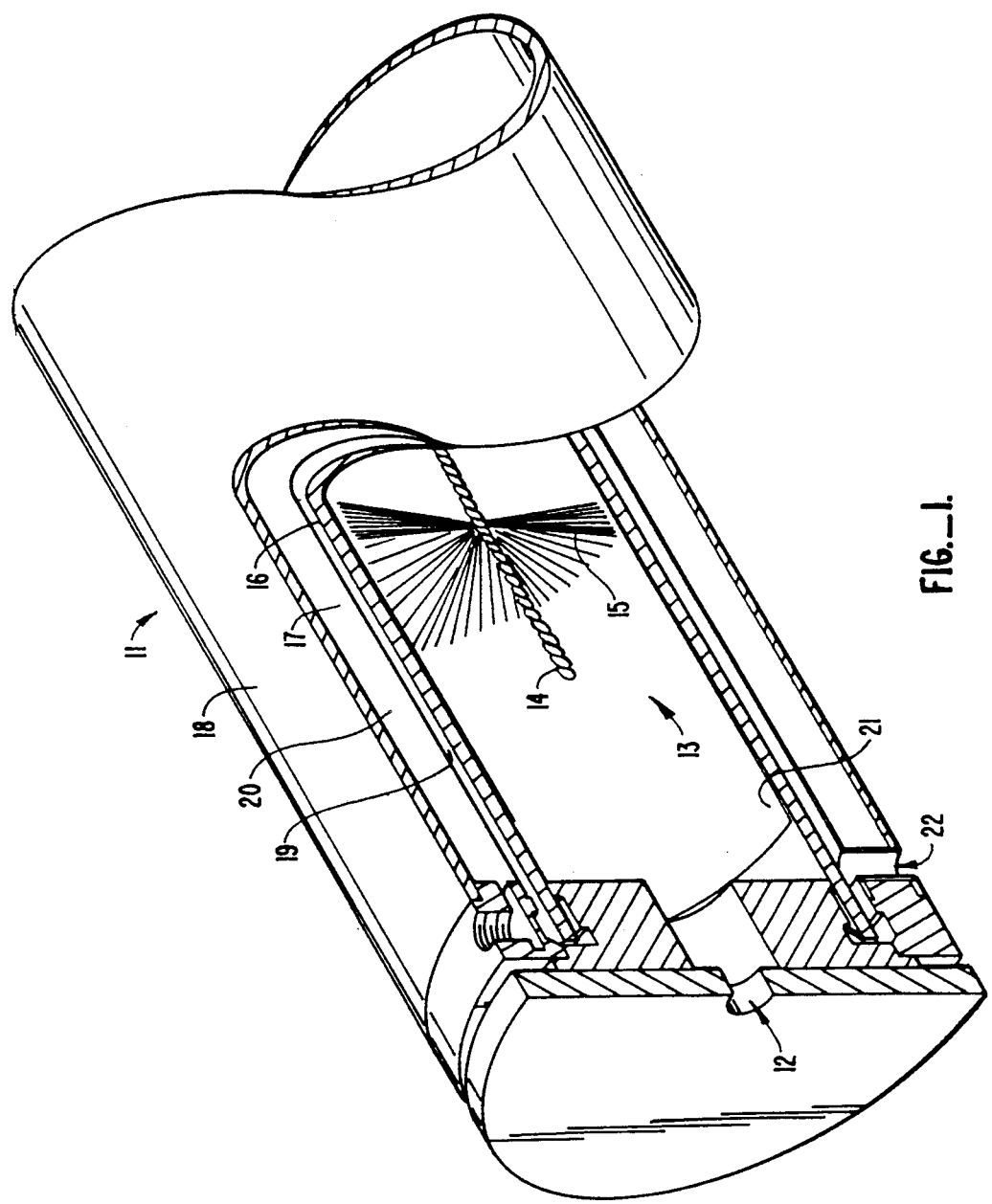

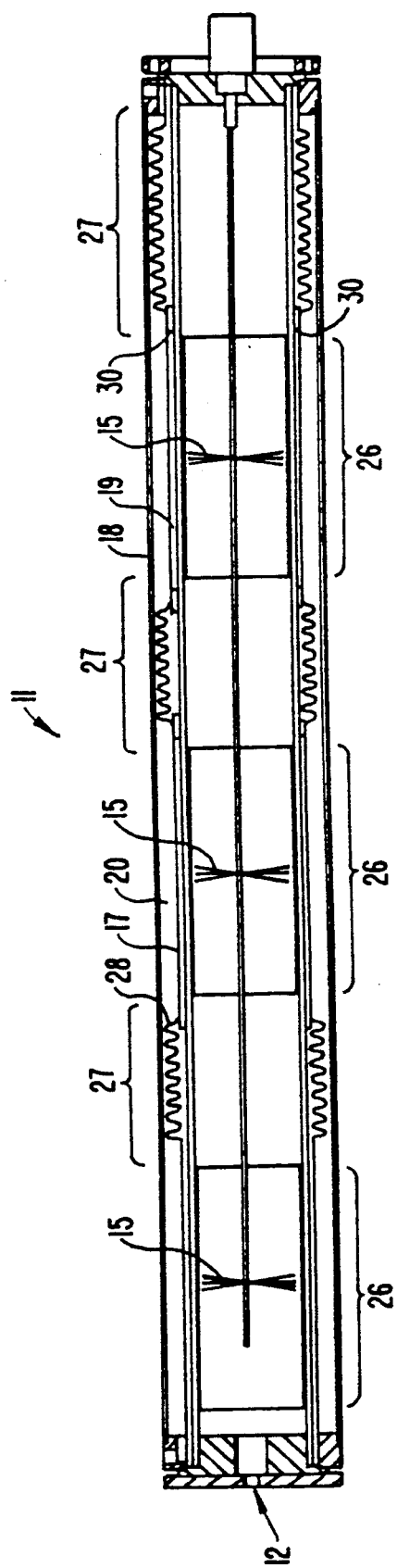
FIG._2.

1

OZONE CELL WITH COOLING BELLOWS

This invention lies in the field of ozone generation cells employing corona discharge.

BACKGROUND AND SUMMARY OF THE INVENTION

U.S. Pat. No. 4,877,588 discloses an ozone generating apparatus based on the well known and widely used corona discharge method for converting oxygen and air to ozone. The patent offers improvements to the technology by providing a construction with improved cooling efficiency which, in turn, benefits the electrical efficiency as well. The cell achieves this by alternating corona regions with corona-free regions in the airflow path, and using both the air itself and an external cooling medium to achieve the cooling. The corona discharge occurs in an annular space of narrow width, cooled from both sides. The corona discharge occurs in bands spaced along the length of the annular passage, with heat exchange occurring in the intervening corona-free regions.

A key factor in the corona discharge is the width of the annular passage (i.e., the radial distance between the two cylindrical walls which form the boundaries of the annulus) in which the corona discharge takes place. This width generally ranges from about 1 mm to about 3 mm, and is generally specified to tenths of a millimeter. A variation in the gap width, such as might result from impact or injury to the cell, or from expansion or contraction of the cell materials, may be detrimental to the cell performance. A gap which is too small may cause arcing or short-circuiting, and one which is too large may destroy the ability of the cell to produce a corona discharge. In either case, there is a loss or waste of power and a decrease in the efficiency of the conversion of oxygen to ozone.

An improvement in the ozone cell of U.S. Pat. No. 4,877,588 is presented herein. In accordance with this improvement, the cylinder forming the heat exchange wall between the passage in which the corona discharge takes place and the outer cooling annulus is divided into sections alternating between rigid and deformable. The rigid sections extend along the corona discharge regions, and the deformable sections extend along the corona-free regions. The deformable sections have corrugated contours which provide them with a bellows effect which give the sections flexibility, and in addition, they improve the cooling efficiency by both increasing the heat exchange area and promoting turbulent rather than laminar flow. The deformable sections are thus free to accommodate any expansions or contractions of either themselves or adjacent sections, lessening the strain on the rigid sections to be maintained at a selected gap width from the inner cylinder, controlling the annular corona discharge space to a close tolerance. Spacers are placed at locations adjacent to the rigid sections to maintain the critical spacing between the cylinders.

The advantages offered by this improved construction are many and varied. As mentioned above, the deformable sections permit the materials of construction of the cell to respond to temperature changes occurring in the cell by expanding and contracting, while still maintaining the critical spacing in the corona discharge regions. This provides better control over the corona discharge and, consequently, over the rate and efficiency of ozone generation and use of electricity. The bellows structure in the deformable sections permits the intermediate cylinder to bend from its axis, as well as to expand and contract longitudinally along the axis. Still further, the corrugated contour of these deformable sections imparts turbulence to the flow of fluid on both sides, improving heat exchange and mixing. Thus, both the ozone-containing air and the external heat exchange medium (generally, water) experience turbulent flow, improving the heat exchange efficiency, and consequently either lowering the power requirement for a given production level or increasing the production obtained at a given power level.

Other advantages and features of the invention will be apparent from the description which follows.

BRIEF DESCRIPTION OF THE DRAWINGS

FIG. 1 is a perspective view and partial cutaway of an ozone cell in accordance with the present invention.

FIG. 2 is a longitudinal cross section of the ozone cell of FIG. 1.

DETAILED DESCRIPTION OF THE INVENTION AND PREFERRED EMBODIMENTS

This discussion will begin with a description of the features of the ozone cell itself, and continue with a description of the arrangement of rigid and deformable heat transfer wall sections.

The basic features of the ozone cell may be seen in FIG. 1. In the ozone cell 11, an oxygen-containing gas (conveniently, air) is supplied continuously to a gas inlet port 12 from an external source (not shown in the drawing). The gas inlet port 12 directs the incoming gas into a central flow passage 13 through which the gas flows axially toward the opposite end of the cell (toward the right in the view shown in the drawing). Electrical energy is supplied to the cell through a high voltage connection at the end opposite the gas inlet (not shown in the drawing). From this connection, the electric power is transmitted to an axial conductor 14, which in turn transmits the power to a series of radial brushes 15.

The cell itself is constructed of three cylinders—an inner cylinder 16, an intermediate cylinder 17, and an outer cylinder 18. The inner cylinder 16 surrounds the central flow passage 13 referred to above; the inner cylinder 16 and the intermediate cylinder 17 define an annular space 19; and the intermediate cylinder 17 and the outer cylinder 18 define an additional annular space 20. The inner cylinder 16 is made of a thermally conductive dielectric material, transmitting heat but not electric current. Along the inside surface of an inner cylinder are a series of bands 21 of electrically conductive material, spaced apart in the axial direction to leave intervening electrically non-conductive regions. This is shown in FIG. 2, and described in more detail below. The intermediate cylinder 17 is both thermally and electrically conductive. The outer wall 18 serves neither heat exchange nor electrical functions, and may be of any material.

Flow passages in the cell direct the flow of the oxygen-containing gas axially through the central passage 13 in one direction (to the right in the view shown in the drawing), and then axially back through the first annular passage 19 in the opposite direction (to the left) and finally out through an outlet port 22 for use. The connecting passage between the central flow passage 13 and the inner annular passage 19 is not shown in the drawing. A coolant fluid such as water is passed through the outer annular passage 20 in the same direction as the incoming air flow through the central flow passage 13, both of which are counter-current to the flow of gas through the inner annulus 19.

The electrified radial brushes 15 contact the electrically conductive bands 21, creating a corona discharge when the proper voltage is applied in the inner annular space 19 adjacent to these bands. Corona discharge areas in the inner annulus 19 thus extend the length of each of the bands. The corona discharge converts some of the oxygen in the oxygencontaining gas passing through those regions to ozone. As the resulting mixture continues along the inner annulus 19, it passes between alternating corona discharge regions and corona-free regions. In these corona-free regions, the mixture is cooled by heat exchange with coolant in the outer annulus 20 through the intermediate wall 17. By lowering the temperature of the mixture, these corona-free regions minimize the occurrence of decomposition of the newly produced ozone gas, which tends to occur at elevated temperatures. Other details of the structure, knowledge of which is not essential to an understanding of the present invention, are described in Ditzler, et al., U.S. Pat. No. 4,877,588, which is incorporated herein by reference.

FIG. 2 shows the longitudinal arrangement of the corona discharge and corona-free regions. The embodiment shown in this drawing contains three corona discharge regions 26 and three corona-free regions 27. Individual radial brushes 15 in the central flow passage provide power to each of the three corona discharge regions. While cooling occurs in both the corona discharge and corona-free regions, the cooling is most effective in the corona-free regions 27 since it does not compete with the heating effect of the corona discharge. In all of these regions, the bulk of the heat exchange occurs across the intermediate cylinder 17, between the gas mixture in the inner annulus and the coolant (water or other heat exchange liquid) in the outer annulus 20.

As shown in FIG. 2, the inner cylinder 17 is comprised of two types of sections, the first being rigid cylindrical sections along the corona discharge regions 26, and the second being deformable corrugated sections along the corona-free regions 27. The corrugations in these deformable sections are in the circumferential (as opposed to axial) direction, giving the deformable sections a contour similar to that of a bellows.

The number and size of corrugations for each section is not critical, and can vary with the length of the section and the overall size of the device. In general, at least four corrugations per section, preferably at least seven, will be included. In the embodiment shown in the drawings, two of the sections have eight corrugations each, while the third has twelve. Since the width of the outer annular passage 20 through which the coolant liquid passes is considerably greater (and less critical) than the width of the inner annular passage 19, the corrugations 28 extend into the outer annular passage 20, but leave sufficient clearance (i.e., are separated from the external 18 by a sufficient distance) to permit the coolant liquid to pass.

The corrugations 28 may be formed of the same material as the rigid cylindrical sections over the corona discharge regions 26. The corrugated sections may, however, be of a thinner gauge material if desired.

The corrugations provide flexibility to the intermediate cylinder 17, permitting it to expand and contract (in a manner analogous to that of an accordion) as well as to bend away from the central axis of the cell, such as might occur when uneven heating of one or more of the cylinders causes a lateral distortion. These corrugated sections thus serve to accommodate any stresses or strains which might arise as a result of excessive heat generation, inefficient cooling, or startup and shutdown conditions. The corrugated sections thereby ease the forces of stress and strain on all other portions of the various components making up the device.

One of the most important benefits gained by the flexibility provided by the corrugated sections is the ease in maintaining a uniform gap in the corona discharge regions at a preselected gap width. This gap width is the radial distance between the inner cylinder 16 and the rigid cylindrical portions of the intermediate cylinder 17. The gap width affects the corona discharge, and controlling the gap width thus affects the efficiency of the unit. By preventing excessive heat buildup as well as short-circuiting, a controlled gap width also preserves the materials of construction of the cell, thus maintaining a long life for the cell.

To further maintain the selected gap width, the structure preferably includes a series of spacer blocks 30 positioned between the inner and intermediate cylinders either inside or close to the outer edges of the corona discharge regions 26. Each of these blocks is of a width equal to the selected gap width of the corona discharge regions. Although not visible in the view shown in FIG. 2, the blocks are spaced apart around the circumference of the inner cylinder 16, permitting gas flow between them, and thereby minimizing any obstruction to the flow. The blocks are positioned along both edges of each corona discharge region 26 which has a corrugated cylindrical section on both sides.

The combined effect of the corrugated sections and the spacer blocks is that they relieve strain in the cylinders and permit the inner cylinder 16 to center itself inside the intermediate cylinder 17. The corrugated sections and the spacer blocks thus permit the intermediate cylinder 17 to conform to the contour of the inner cylinder 16. When the inner cylinder 16 is made of a ceramic material, as it is in preferred embodiments of the invention, this ability to conform to the contour of the inner cylinder is particularly beneficial since ceramic cylinders are most often not perfectly straight.

The material from which the spacer blocks are made is preferably a dielectric material, to eliminate any possibility of interference with the corona discharge. Conventional ceramic materials may be used.

The dimensions of the various components of the cell, other than the gap width in the corona discharge regions, are generally noncritical and may be varied widely. The materials of construction are likewise noncritical, and conventional materials may be used. One example of a cell manufactured in accordance with this invention will have an external length of 31.6 inches (80.3 cm), an external diameter of 4.0 inches (10.2 cm), an outer wall 18 thickness of 0.065 inch (0.165 cm), an intermediate wall 17 thickness of either 0.028 inch (0.071 cm) or 0.035 inch (0.089 cm) in the straight sections and 0.008 inch (0.020 cm) in the corrugated sections, and an inner cylinder 16 thickness of 0.125 inch (0.318 cm), with an outer annular passage having a gap width of 0.45 inch (1.14 cm), and an inner annular passage having a gap width of 0.9 inch (2.3 cm). The inner cylinder 16 is 30.95 inches (78.6 cm) in length and 2.75 inches (6.98 cm) in diameter. The electrically conductive regions are each 5.5 inches (14.0 cm) long. The uppermost corona-free region 27 (at the far right in the view shown in FIG. 2) is 5.619 inches (14.27 cm) long, and the second and third are each 3.800 inches (9.65 cm) long. The electrically conductive components are of stainless steel, and the inner dielectric cylinder is made of conventional ceramic. The spacer blocks are 0.080 inch (0.203 cm) in thickness, defining a corona discharge gap width of the same value.

The appropriate spacer thickness (and hence the corona discharge gap width) for any particular cell will vary depending on various other parameters of the system. In most cases, a gap width ranging from about 1 mm to about 3 mm will provide the best results. The axial dimensions of the corona discharge and corona-free regions may also vary, best results generally being obtained using axial lengths ranging from about 2 cm to about 20 cm.

The foregoing is offered primarily for purposes of illustration. It will be readily apparent to those skilled in the art that numerous variations, including substitutions, modifications, and departures of various kinds from the features shown and described herein may be made without departing from the spirit and scope of the invention.

What is claimed is:

1. In apparatus for generating ozone from an oxygen-containing gas, in which said apparatus comprises:

an inner cylinder, an intermediate cylinder, and an outer cylinder, said inner and intermediate cylinders defining a first annular space and said intermediate and outer cylinders defining a second annular space, gas flow passage means to direct gas flow first through said inner cylinder and then back through said first annular space, a plurality of conductive bands along said inner cylinder to define corona discharge regions in said first annular space, said conductive bands separated by non-conductive bands to define corona-free regions in said first annular space to permit cooling of gas passing therethrough through said inner and intermediate cylinders to remove heat generated in said corona discharge regions, and means for supplying current to said conductive bands, the improvement in which said intermediate cylinder is comprised of rigid sections adjacent to said corona discharge regions and deformable sections adjacent to said corona-free regions, said deformable sections contoured into substantially circumferential corrugations.

2. Apparatus in accordance with claim 1 in which, further in accordance with said improvement, said inner and intermediate cylinders are separated by spacers at positions along said rigid sections, fixing the width of said first annular space in said corona discharge regions.

3. Apparatus in accordance with claim 2 in which said spacers are blocks of dielectric material positioned at boundary regions joining adjacent rigid and deformable regions of said intermediate cylinder.

4. Apparatus in accordance with claim 1 in which each said deformable section comprises at least four corrugations.

5. Apparatus in accordance with claim 1 in which each said deformable section comprises at least seven corrugations.

* * * * *